US008358616B2

(12) United States Patent
Shan et al.

(10) Patent No.: US 8,358,616 B2
(45) Date of Patent: Jan. 22, 2013

(54) PEER-TO-PEER COMMUNICATION CHARGING METHOD, COMMUNICATION SYSTEM AND CHARGING DEVICE (75) Inventors: Mingjun Shan, Shenzhen (CN); Chun Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1015 days.

(21) Appl. No.: 12/117,046

(22) Filed: May 8, 2008

(65) Prior Publication Data

US 2008/0281621 A1 Nov. 13, 2008

(30) Foreign Application Priority Data

May 12, 2007 (CN) .......................... 2007 1 0106201

(51) Int. Cl.
*H04W 4/00* (2009.01)
*G06Q 40/00* (2012.01)
*H04M 11/00* (2006.01)
(52) U.S. Cl. ..................... 370/329; 705/40; 455/406
(58) Field of Classification Search ............. 370/329
See application file for complete search history.

(56) References Cited

U.S. PATENT DOCUMENTS

| 7,454,206 | B1* | 11/2008 | Phillips et al. | 455/435.1 |
| 2004/0229596 | A1* | 11/2004 | Stura et al. | 455/406 |
| 2005/0213580 | A1* | 9/2005 | Mayer et al. | 370/395.2 |
| 2006/0095365 | A1* | 5/2006 | Ravikumar et al. | 705/37 |
| 2007/0189300 | A1* | 8/2007 | Bellora et al. | 370/395.2 |
| 2008/0004974 | A1* | 1/2008 | Bawcutt | 705/26 |

FOREIGN PATENT DOCUMENTS

| CN | 1444824 A | 9/2003 |
| CN | 1829339 A | 9/2006 |
| CN | 101163022 B | 3/2012 |
| WO | WO 0191446 A3 | 3/2003 |
| WO | WO 2006021524 A1 | 3/2006 |

OTHER PUBLICATIONS

Campbell et al., "The Message Session Relay Protocol—draft-ietf-simple-message-sessions-10.txt", Simple WG, Feb. 20, 2005.
Campbell et al., The Message Session Relay Protocol—draft-ietf-simple-message-sessions-15, Network Working Group, Jun. 24, 2006.

(Continued)

*Primary Examiner* — Derrick Ferris
*Assistant Examiner* — Shaq Taha
(74) *Attorney, Agent, or Firm* — Brinks Hofer Gilson & Lione (57) ABSTRACT

A peer-to-peer communication charging method for charging instant messaging services in a peer-to-peer network, includes the steps of: a) sending, by a service application server to a charging system, an application layer charging message including application layer charging information, a subsystem layer charging correlation identifier and/or a bearer layer charging correlation identifier; b) sending, by a subsystem layer to the charging system, a subsystem layer charging message including subsystem layer charging information, the subsystem layer charging correlation identifier and the bearer layer charging correlation identifier; c) sending, by a bearer layer to the charging system, a bearer layer charging message including bearer layer charging information, the subsystem layer charging correlation identifier and the bearer layer charging correlation identifier; and e) associating, by the charging system, the received charging messages with one another and performing charging.

23 Claims, 3 Drawing Sheets

OTHER PUBLICATIONS

Rosenburg et al., "SIP: Session Initiation Protocol", Network Working Group, Jun. 2002.

Open Mobile Alliance, "Requirements for the Utilization of IMS capabilities", Version 1.0, OMA-RD_IMSinOMA-V1_0-20040518-A, May 18, 2004.

Open Mobile Alliance, "Instant Messaging Requirements", Draft Version 1.0, OMA-RD_IM-V1_0-20060326-D, Mar. 26, 2006.

Open Mobile Alliance, "Instant Messaging Using SIMPLE", Draft Version 1.0, OMA-TS-IM_SIMPLE-V1_0_0-20061002-D, Oct. 2, 2006.

Open Mobile Alliance, "Instant Messaging Using SIMPLE Architecture", Draft Version 1.0.0, OMA-AD-IM_SIMPLE-V1_0_0-20061011-D, Oct. 11, 2006.

3$^{rd}$ Generation Partnership Project; Technical Specification Group Services and System Aspects; IP Multimedia Subsystem (IMS); Stage 2 (Release 6). 3GPP TS 23.228, V6.10.0, Jun. 2005.

3$^{rd}$ Generation Partnership Project; Technical Specification Group Service and System Aspects; Telecommunications Management; Charging Management; IP Multimedia Subsystem (IMS) Charging (Release 6). 3GPP TS 32.260, V6.7.0, Sep. 2006.

* cited by examiner

PEER-TO-PEER COMMUNICATION CHARGING METHOD, COMMUNICATION SYSTEM AND CHARGING DEVICE

CROSS REFERENCE TO RELATED APPLICATIONS

The present application claims priority under 35 U.S.C. §119 from Chinese Patent Application Number 200710106201.X, which was filed on May 12, 2007, and is hereby incorporated by reference in its entirety.

FIELD OF THE INVENTION

The present invention relates to the communication field, and in particular to a peer-to-peer communication charging method, communication system and charging device.

BACKGROUND OF THE INVENTION

A feature of Instant Messaging (IM) services is possible instant communication over a network. IM, which emerged not long ago, has become one of the most popular services over the Internet.

Along with high speed development of the mobile communication market, the number of users of mobile phones is increasing rapidly, and integration of IM and mobile communication becomes an inevitable trend. Users have a strong demand for keeping IM online constantly while they are outgoing. For IM providers, applying IM services over the Internet to the mobile communication field will widely broaden revenue sources; and for operators, mobile IM provides an important service leading to improved revenues from data services, an increased Average Revenue Per User (ARPU) value and a reduced loss of users. In this case, precise charging of various IM services deployed over a mobile network becomes a key issue of successful operation of mobile IM services.

Figure 1:
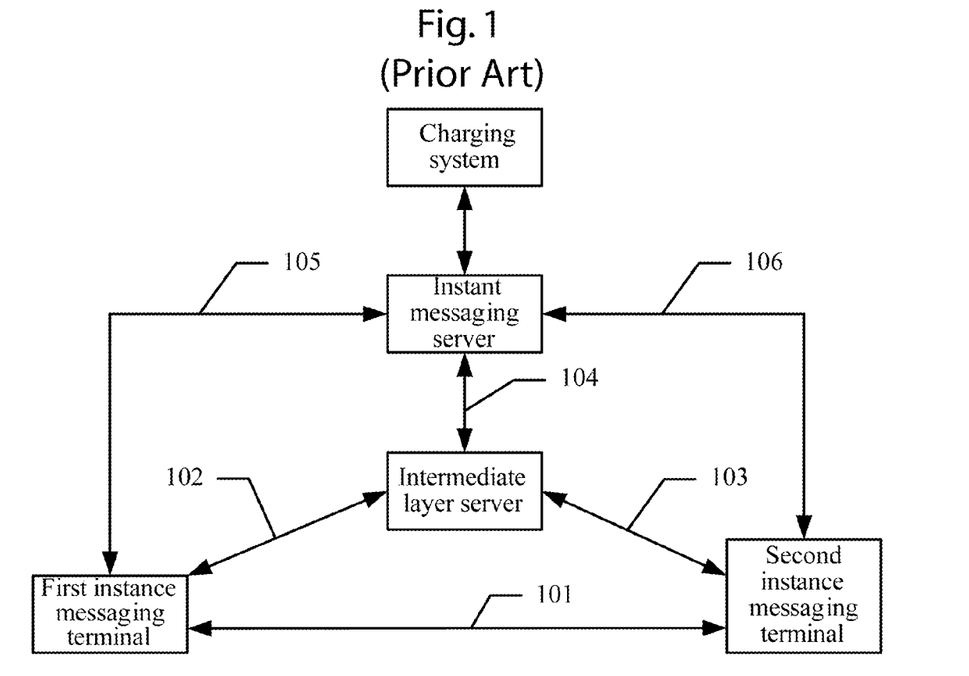
FIG. 1 is a schematic diagram of a functional structure of an IM system in the prior art.

With reference to FIG. 1, in a communication charging method existing in the related art, when a text or multimedia message or file is transmitted between IM users, an operator relays and forwards message media contents through an IM server in order to concentratively control or collect media transmission information.

As illustrated in FIG. 1, reference signs 101, 105 and 106 each denote transmission of Message Session Relay Protocol (MSRP) messages, and reference signs 102, 103 and 104 each denote transmission of Session Initiation Protocol (SIP) messages.

In this case, either a Page Mode message transmitted using the SIP MESSAGE protocol or a session based IM message transmitted using the MSRP between the IM users needs to pass through the IM server. The IM server can obtain information in the IM message required for various charges. Charging messages are collected and sent to a charging system so that the charging system can accomplish charging of an IM service.

However, when one-to-one IM communication is conducted between only two IM users, message contents may not pass through the IM server, but instead be transmitted directly between the IM users in order to improve efficiency of media transmission. This transmission approach is referred to as peer-to-peer transmission.

When information is transmitted using the MSRP between two IM users in peer-to-peer communication, MSRP messages are not forwarded through the IM server.

In the solution of the related art, for such a peer-to-peer communication service, only start time and end time of a session can be acquired at an application layer. As a result, precise charging of peer-to-peer communication can not be implemented.

For a service based upon an IP Multimedia Subsystem (IMS), for example, usage of media resources after establishment of a session cannot be obtained by session charging applicable to MRSP communication, so that precision of charging can not be guaranteed and charging and operation of an IM service by an operator may be influenced.

SUMMARY OF THE INVENTION

The invention is addressed to provide a peer-to-peer communication charging method, communication system and charging device which can perform precise charging of an IM service in peer-to-peer communication.

According to an embodiment of the invention, a peer-to-peer communication charging method includes: sending, by a service application server to a charging system, an application layer charging message including application layer charging information, a subsystem layer charging correlation identifier and/or a bearer layer charging correlation identifier; sending, by a subsystem layer to the charging system, a subsystem layer charging message including subsystem layer charging information, a subsystem layer charging correlation identifier and a bearer layer charging correlation identifier; sending, by a bearer layer to the charging system, a bearer layer charging message including bearer layer charging information, a subsystem layer charging correlation identifier and a bearer layer charging correlation identifier; and associating, by the charging system, the received charging messages in accordance with the received subsystem layer charging correlation identifiers and/or bearer layer charging correlation identifiers, and performing charging in accordance with charging information in the correlated charging messages.

Optionally, before sending, by the service application server to the charging system, the application layer charging message including the application layer charging information, the subsystem layer charging correlation identifier and/or the bearer layer charging correlation identifier, the method further includes: obtaining, by the subsystem layer, an invite message originated from a first instance messaging terminal to the subsystem layer; allocating, by the subsystem layer, a subsystem layer charging correlation identifier in accordance with the invite message, and reserving a media transmission resource between the first instant messaging terminal and the bearer layer; generating, by the bearer layer, a bearer layer charging correlation identifier in accordance with the media transmission resource, and exchanging the subsystem layer charging correlation identifier and the bearer layer charging correlation identifier with the subsystem layer; and sending, by the subsystem layer to the service application server, the invite message in which the subsystem layer charging correlation identifier and/or the bearer layer charging correlation identifier is/are carried.

Optionally, the process of correlating, by the charging system, the received charging messages in accordance with the received subsystem layer charging correlation identifiers and/or bearer layer charging correlation identifiers includes: correlating the subsystem layer charging message with the application layer charging message in accordance with the subsystem layer charging correlation identifier in the application layer charging message and the subsystem layer charging correlation identifier in the subsystem layer charging message; correlating the subsystem layer charging message and the bearer layer charging message in accordance with the bearer layer charging correlation identifier in the subsystem layer charging message and the bearer layer charging correlation identifier in the bearer layer charging message, and then correlating the bearer layer charging message and the application layer charging message; obtaining the same port numbers and peer-to-peer uniform resource locators in the bearer layer charging information in the correlated bearer layer charging message as those in the application layer charging information in the application layer charging message; and obtaining information on bearer traffic transmitted during a session in accordance with the obtained peer-to-peer uniform resource locators and port numbers.

Optionally, the process of correlating, by the charging system, the received charging messages in accordance with the received subsystem layer charging correlation identifiers and/or bearer layer charging correlation identifiers includes: correlating the bearer layer charging message and the application layer charging message in accordance with the bearer layer charging correlation identifier in the application layer charging message and the bearer layer charging correlation identifier in the bearer layer charging message; obtaining the same port numbers and peer-to-peer uniform resource locators in the bearer layer charging information in the correlated bearer layer charging message as those in the application layer charging information in the application layer charging message; and obtaining information on bearer traffic transmitted during a session in accordance with the obtained peer-to-peer uniform resource locators and port numbers.

According to an embodiment of the invention, another peer-to-peer communication charging method includes: sending, by a service application server, upon receipt of a session request message for establishing peer-to-peer communication originated from a client, charging information to a charging system in accordance with the session request message, and the method further includes: generating, by the service application server, peer-to-peer session charging information in accordance with peer-to-peer session information of peer-to-peer communication parties as well as a subsystem layer charging correlation identifier and/or bearer layer charging correlation identifier generated by a peer-to-peer communication service network system; sending, by the service application server, the peer-to-peer session charging information to the charging system, wherein the peer-to-peer session charging information includes the peer-to-peer session information of the peer-to-peer communication parties as well as the subsystem layer charging correlation identifier and/or bearer layer charging correlation identifier, and the peer-to-peer session information as well as the subsystem layer charging correlation identifier and/or bearer layer charging correlation identifier are used by the charging system to obtain charging information of a subsystem layer and/or bearer layer corresponding to the peer-to-peer communication service and perform correlation.

According to an embodiment of the invention, a communication system includes a service application server, a subsystem layer, a bearer layer and a charging system, wherein the service application server is adapted to send to the charging system an application layer charging message including application layer charging information, a subsystem layer charging correlation identifier and/or a bearer layer charging correlation identifier; the subsystem layer is adapted to send to the charging system a subsystem layer charging message including subsystem layer charging information, a subsystem layer charging correlation identifier and a bearer layer charging correlation identifier; the bearer layer is adapted to send to the charging system a bearer layer charging message including bearer layer charging information, a subsystem layer charging correlation identifier and a bearer layer charging correlation identifier; and the charging system is adapted to correlate the received charging messages in accordance with the received subsystem layer charging correlation identifiers and/or bearer layer charging correlation identifiers and perform charging in accordance with the charging information in the correlated charging messages.

According to an embodiment of the invention, a charging device includes an obtaining unit, a correlating unit and a charging unit, wherein the obtaining unit is adapted to respectively obtain from a service application server an application layer charging message including application layer charging information, a subsystem layer charging correlation identifier and/or a bearer layer charging correlation identifier, obtain from a bearer layer a bearer layer charging message including bearer layer charging information, a subsystem layer charging correlation identifier and a bearer layer charging correlation identifier, and obtain from a subsystem layer a subsystem layer charging message including subsystem layer charging information, a subsystem layer charging correlation identifier and a bearer layer charging correlation identifier; the correlating unit is adapted to correlate the obtained charging messages in accordance with the obtained subsystem layer charging correlation identifiers and/or bearer layer charging correlation identifiers; and the charging unit is adapted to perform charging in accordance with the charging information in the correlated charging messages.

According to an embodiment of the invention, a service application server includes a receiving unit, a charging information generating unit and a transmitting unit, wherein the charging information generating unit is adapted to generate peer-to-peer session charging information in accordance with a subsystem layer charging correlation identifier and/or bearer layer charging correlation identifier generated by a peer-to-peer communication network system as well as peer-to-peer session information of peer-to-peer communication parties, which are received by the receiving unit, and the peer-to-peer session charging information is carried in a charging request message which is transmitted by the transmitting unit to a charging system.

As can be seen from the above technical solutions, the invention provides the following advantages.

In the invention, the charging system obtains the application layer charging information, the subsystem layer charging information and the bearer layer charging information respectively, correlates the application layer charging information and the bearer layer charging information by the charging correlation identifiers between the respective layers and obtains information on a bear layer traffic in peer-to-peer communication from the bearer layer information, thereby improving precision of the charging information and further implanting precise charging of an instant messaging service in peer-to-peer communication.

BRIEF DESCRIPTION OF THE DRAWINGS

The features of the present invention will become more apparent from the Detailed Description of the Invention, which proceeds with reference to the Drawings, in which.

DETAILED DESCRIPTION OF THE INVENTION

The disclosure describes a peer-to-peer communication charging method, communication system and charging device for implementing precise charging of an IM service in peer-to-peer communication.

Figure 2:
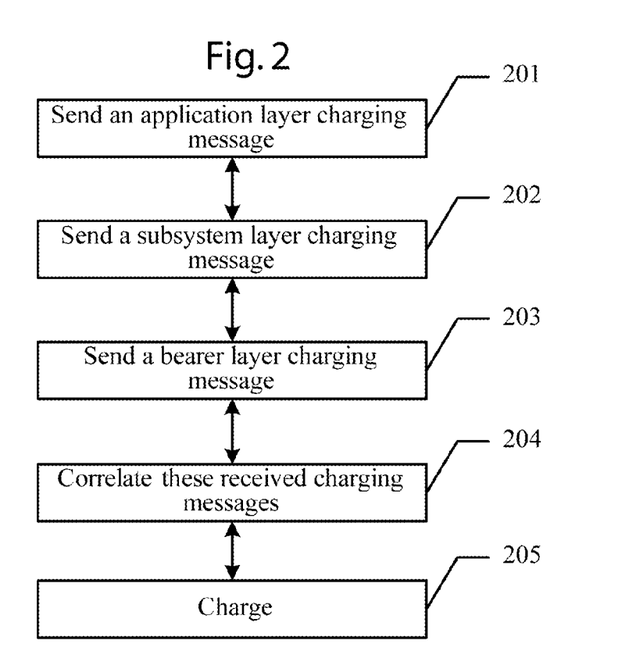
FIG. 2 is a flow chart illustrating a first embodiment of a method according to the present invention.

With reference to FIG. 2, an embodiment of a method according to the invention includes the following steps:

201. A service application server sends to a charging system an application layer charging message including application layer charging information, a subsystem layer correlation identifier (IMS Charging Identifier, or "ICID") and/or a bearer layer charging correlation identifier (General Packet Radio Service (GPRS) Charging Identifier, or "GCID").

Particularly, the application layer charging information may include any one or more of a peer-to-peer Uniform Resource Locator (URL), a negotiated MSRP port number, and the like.

202. A subsystem layer sends to the charging system a subsystem layer charging message including subsystem layer charging information, an ICID and a GCID.

203: A bearer layer sends to the charging system a bearer layer charging message including bearer layer charging information, an ICID and a GCID.

The bearer layer charging information includes any one or more of the negotiated port number, the peer-to-peer URL, a stream identifier, and the like.

The GCID is generated when a media resource is reserved between an IM terminal and the bearer layer and is exchanged with the ICID generated during a SIP session. In other words, the bearer layer obtains the ICID and the subsystem layer obtains the GCID.

Because an identifier borne at an underlying layer may involve a plurality of data streams, the bearer layer further differentiates traffic information for the MSRP in accordance with the peer-to-peer URL and negotiated port number used by MSRP to look up the stream identifier of a MSRP traffic, and obtains the corresponding traffic information including information on transmitted and received MSRP traffic.

204: These received charging messages are correlated.

Particularly, the charging system correlates the received charging messages in accordance with the received ICID and/or GCID, and so that charging can be performed in accordance with the correlated charging messages.

205. Charging is performed.

Particularly, the charging system performs charging of peer-to-peer communication in accordance with the charging information in the correlated charging messages.

The present invention will be described in detail hereinafter with respect to specific embodiments.

In a first embodiment, an IP Multicast Subsystem (IMS) acts as the subsystem layer, and a GPRS Gateway Support Node (GGSN) with a Traffic Plane Function (TPF) acts as the bearer layer.

Particularly, the TPF is a function entity defined by the Third Generation Partnership Project (3GPP) to support traffic charging. By using a stream based charging function, the TPF can distinguish between user data traffic belonging to different service data streams in accordance with IP addresses and ports to obtain a traffic charging message of a protocol specific port, and sends the traffic charging message to the charging system.

In this embodiment, two parameters are added into a charging message of the TPF, which are illustrated in Table 1:

TABLE 1

| | |
|---|---|
| Bearer service identifier | This bearer service identifier can uniquely identify bearing media stream information used by a service, and may be, for example, a port number or a protocol name and a port number (e.g., HTTP, RTP, MSRP), etc. |
| ICID | A charging correlation identifier at the IMS layer, which is generated by a first ISM entity when an IMS session is established, is stored in a head field of a SIP message for transport and is transported to the GGSN/TPF upon media resource authorization. |

The charging system can subsequently perform correlation in accordance with these two charging parameters.

Particularly, the bearer service identifier is a service stream identifier obtained at a Packet Data Protocol (PDP) Context layer, and with a smaller granularity than that of a PDP context, i.e., an identifier allocated for each service, which may be, for example, as follows:

a TCP port number of a Packet Data Protocol (PDP) bearer protocol, or a protocol name of a fixed port number, e.g., Real-time Transport Protocol (RTP), Real-time Streaming Protocol (RTSP), etc., or the minimum granularity of a certain service identifier.

Figure 3:
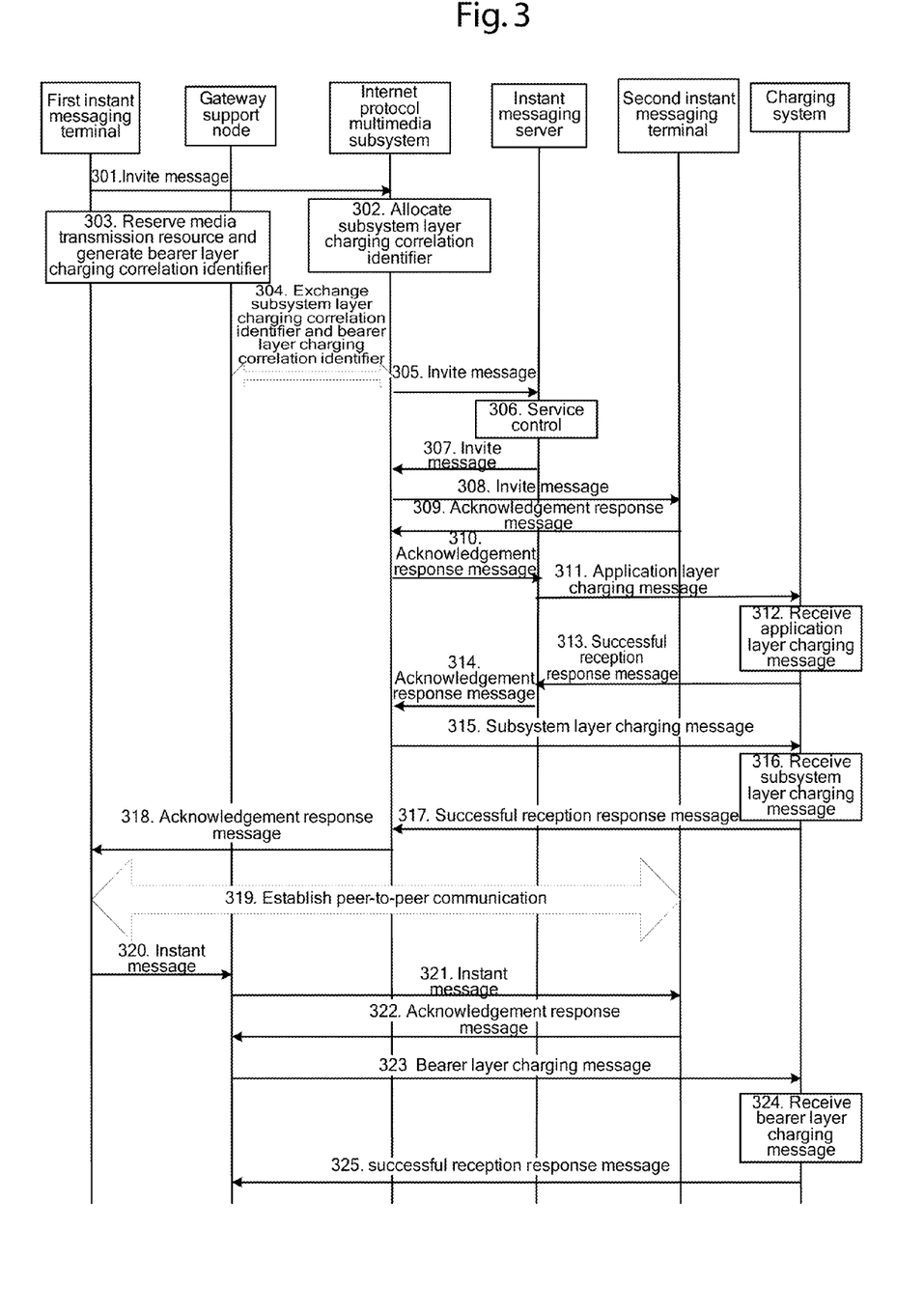
FIG. 3 is a signaling flow chart of a second embodiment of the method according to the present invention.

With reference to FIG. 3, another embodiment of the method according to the invention has a flow as follows.

301. A first IM terminal sends to the IMS an INVITE request carrying a content description parameter (SDP1) of the first terminal.

302. A first network entity of the IMS allocates an ICID for identifying the present IMS session.

Particularly, the first network entity of the IMS is typically a Proxy-Call Session Control Function (P-CSCF) entity in communication with the terminal.

The ICID shall be unique for the whole network including, the IM server and the IMS layer, during an IMS session, and is generated by an IMS entity which is the first to receive a SIP INVITE request.

The generating step may adopt the following rule to produce the ICID:

an identifier of a network node added to a local (in the network node) unique random or sequence sign in a period of time.

The identifier can be generated to be a unique global identifier in the network due to uniqueness of the identifier of the network node in the network and the uniqueness of the local unique random or sequence sign.

One mechanism for generating the ICID is as follows.

The IM terminal initiates an INVITE request for an MSRP session:

---

F1 INVITE UA1 -> P1
    INVITE sip:joe@example.com SIP/2.0
    Via: SIP/2.0/UDP 192.0.2.4:5060; branch=z9hG4bKnashds7
    To: sip:joe@example.com
    From: sip:ua1@home1.net; tag=456248
    Call-ID: 843817637684230998sdasdh09
    CSeq: 18 INVITE
    Contact: sip:ua1@192.0

---

At the IMS network side, if a network node which is the first to accept this request is a P-CSCF entity, then the P-CSCF entity forwards the INVITE request into a SIP INVITE request to a next network node, Interrogating-Call Session Control Function (I-CSCF) entity:

```
F2 INVITE P1 -> P2
INVITE sip:joe@example.com SIP/2.0
Via: SIP/2.0/UDP P1.home1.net:5060; branch=z9hG4bK34ghi7a
Via: SIP/2.0/UDP 192.0.2.4:5060; branch=z9hG4bKnashds7
To: sip:joe@example.com
From: sip:ua1@home1.net; tag=456248
Call-ID: 843817637684230998sdasdh09
CSeq: 18 INVITE
Contact: sip:ua1@192.0.2.4
P-Charging-Vector: icid=1234bc9876e;
``` where the ICID has a value which is a unique value generated at the P-CSCF entity.

303. A media transmission resource is reserved between the first IM terminal and the GGSN/TPF and a GCID is generated.

304. The ICID and the GCID are exchanged between the GGSN/TPF and the IMS.

305. The IMS forwards the INVITE request carrying a first parameter according to the Session Description Protocol (SDP1), the ICID and/or the GCID to the IM server.

306. The IM server performs service control.

307. The IM server forwards the INVITE request carrying the ICID, an IM service identifier and the SDP1 to an IMS to which a second IM terminal belongs.

308. The IMS forwards the INVITE request from which various charging identifiers are removed to the second IM terminal.

309. The second IM terminal replies to the IMS with a "200 OK" response message.

310. The IMS replies to the IM server with a "200 OK" response message including a content description parameter (SDP2) of the second IM terminal and the GCID.

311. The IM server sends to the charging system an application charging message including MSRP charging information (MSRP Charging Info), the ICID and/or the GCID.

Herein, a description of the above-presented parameters is illustrated in Table 2:

TABLE 2

| | |
|---|---|
| ICID | An identifier used to correlate IMS layer charging information; generated by an IMS node which is the first to accept the SIP request; stored in the SIP head P-CHARGING-VECTOR and transported to respective entities at the IMS layer along an IMS session channel; and obtained from the IMS entity during service control interaction with the IMS server. |
| GCID | Used to correlate a PDP-Context-ID with IMS bearer stream charging; generated by the GGSN; corresponding to a Charging ID in TPF charging information; transported from the GGSN/TPF to the P-CSCF entity of the IMS upon media resource authorization; and transported to respective IMS entities during an IMS session. |
| MSRP Charging Info | This parameter records URLs and port numbers for a two-party MSRP session, which are negotiated through the SIP SDP. The charging system correlates this parameter with traffic charging information from the TPF to filter out traffic charging information for an MSRP peer-to-peer session from the traffic charging information of the TPF. The parameter is transported to the IM server during service control interaction of the IMS layer with the IM server and includes:<br>Originator URL: URL address of an originator<br>Original-MSRP-Port: MSRP port number of the originator<br>Destination URL: URL address of a destination<br>Destination-MSRP-Port: MSRP port number of the destination |

Herein, a format of the MSRP is as follows.

For a SIP process:

It is assumed that Alice sends to Bob a request for MSRP connection, which is as follows:

```
INVITE sip:bob@biloxi.example.com SIP/2.0
To: <sip:bob@biloxi.example.com>
From: <sip:alice@atlanta.example.com>; tag=786
Call-ID: 3413an89KU
Content-Type: application/sdp
c=IN IP4 atlanta.example.com
m=message 7654 TCP/MSRP *
a=accept-types:text/plain
a=path:msrp://atlanta.example.com:7654/jshA7we;tcp
SIP/2.0 200 OK
To: <sip:bob@biloxi.example.com>; tag=087js
From: <sip:alice@atlanta.example.com>; tag=786
Call-ID: 3413an89KU
Content-Type: application/sdp
c=IN IP4 biloxi.example.com
m=message 12763 TCP/MSRP *
a=accept-types:text/plain
a=path:msrp://biloxi.example.com:12763/kjhd37s2s2;tcp
```

Alice sends to Bob the following information:

```
ACK sip:bob@biloxi SIP/2.0
To: <sip:bob@biloxi.example.com>; tag=087js
From: <sip:alice@atlanta.example.com>; tag=786
Call-ID: 3413an89KU
```

Here, Bob opens a port numbered 12763 for the MSRP connection, while Alice opens a port numbered 7654 for the MSRP connection. Alice and Bob establish the MSRP connection.

Alice sends a MSRP request to Bob via the port numbered 12763, which is as follows:

```
MSRP a786hjs2 SEND
To-Path: msrp://biloxi.example.com:12763/kjhd37s2s2;tcp
From-Path: msrp://atlanta.example.com:7654/jshA7we;tcp
Message-ID: 87652
Byte-Range: 1-25/25
Content-Type: text/plain
Hey Bob, are you there?
-------a786hjs2$
```

Bob sends a response to Alice via the port numbered 7654, which is as follows:

```
MSRP a786hjs2 200 OK
To-Path: msrp://atlanta.example.com:7654/jshA7we;tcp
From-Path: msrp://biloxi.example.com:12763/kjhd37s2s2;tcp
Byte-Range: 1-25/25
-------a786hjs2$
```

Here, a method for obtaining the MSRP Charging info is as follows.

The IMS entity obtains the MSRP URL and port information of Alice from SDP information of the SIP INVITE message sent from Alice to Bob:

a=path:msrp://atlanta.example.com:7654/jshA7we;tcp

The IMS entity obtains MSRP URL and port information of Bob from the 200 OK message with which Bob replies to Alice:
a=path:msrp://biloxi.example.com: 12763/kjhd37s2s2;tcp The IM server stores the above MSRP URL and port number information in an MSRP Charging Info parameter table.

The MSRP Charging Info related to Alice is:

URL = msrp://atlanta.example.com
port = 7654
The MSRP Charging Info related to Bob is:
URL = msrp://biloxi.example.com
port = 12763

312. The charging system enables an IM Charging Data Record (CDR) function to receive the application layer charging message.

313. The charging system replies to the IM server with an ACR message.

314. The IM server sends a "200 OK" response message to the IMS.

315. The IMS sends to the charging system a subsystem layer charging message including the ICID, the GCID and the MSRP Charging Info.

Herein, a description of the above-presented parameters is as illustrated in Table 3:

TABLE 3

| | |
|---|---|
| ICID | An identifier used to correlate IMS layer charging information; generated by an IMS node which is the first to accept the SIP request; stored in the SIP head P-CHARGING-VECTOR and transported to respective entities at the IMS layer along an IMS session channel; transported to the GGSN/TPF upon media resource authorization; and transported to the IM server during service control interaction with the IM server. |
| GCID | Used to correlate a PDP-Context-ID with IMS bearer stream charging; generated by the GGSN; corresponding to a Charging ID in TPF charging information; transported from the GGSN/TPF to the P-CSCF entity of the IMS upon media resource authorization; and transported to respective IMS entities during an IMS session. |
| MSRP Charging Info | This parameter records URLs and port numbers of a two-party MSRP session, which are negotiated through the SIP SDP. The charging system correlates the parameter with traffic charging information from the TPF to filter out traffic charging information for an MSRP peer-to-peer session from the traffic charging information of the TPF. |

316. The charging system enables the IMS CDR function to receive information sent from the subsystem layer.

317. The charging system replies to the IMS with an ACR;

318. The IMS replies to the first IM terminal with a "200 OK" response message.

319. The first IM terminal and the second IM terminal establish peer-to-peer communication connection in accordance with the MSRP session information carried in the SDP1 and the SPD2.

320. The first IM terminal sends a message intended for the second IM terminal through an MSRP request SEND, wherein this message is firstly sent to the GGSN/TPF.

321. The GGSN/TPF forwards the MSRP SEND information to the second IM terminal.

322. The second IM terminal sends a "200 OK" response message to the GGSN/TPF in reply to the SEND request.

323. The GGSN/TPF sends to the charging system a bearer layer charging message including the ICID, the GCID and bearer layer charging information.

324. The charging system enables an enhanced GGSN generated CDR (eG-CDR) function to receive the information sent from the bearer layer.

325. The charging system replies to the GGSN/TPF with an ACR.

Upon receipt of the information from the IM server, the IMS and the GGSN/TPF, the charging system correlates the information, particularly in the following two ways.

I. The information sent from the IM server includes the GCID, but does not necessarily include the ICID.

In accordance with the GCID in the IM CDR, the charging information from the IM server is correlated with the bearer layer charging information having the same GCID in the GGSN/TPF CDR.

The negotiated port numbers and peer-to-peer URLs in the application layer charging information in the IM CDR are obtained.

The same negotiated port numbers and peer-to-peer URLs among the negotiated port numbers and peer-to-peer URLs in the bearer layer charging information as the negotiated port numbers and peer-to-peer URLs in the application layer charging information, are requested.

The corresponding stream identifier is requested dependent upon the above port numbers and peer-to-peer URLs, and information on bearer traffic transmitted by the message session relay protocol is obtained in accordance with the stream identifier.

II. The information sent from the IM server includes the ICID but not the GCID.

The charging information from the IM server is correlated with the charging information having the same ICID in the IMS CDR in accordance with the ICID in the IM CDR.

The corresponding GCID in the IMS CDR is requested in accordance with the ICID.

The charging information from the IM server is correlated with the bearer layer charging information having the same GCID in the GGSN/TPF CDR in accordance with the GCID.

The negotiated port numbers in the application layer charging information in the IM CDR are obtained.

The same negotiated port numbers and peer-to-peer URLs among the negotiated port numbers and peer-to-peer URLs in the bearer layer charging information as the negotiated port numbers and peer-to-peer URLs in the application layer charging information are requested.

The corresponding stream identifier is requested dependent upon the above port numbers and peer-to-peer URLs, and information on bearer traffic transmitted by the message session relay protocol is obtained in accordance with the stream identifier.

A communication system according to the invention will be described below, which includes:
a service application server, a subsystem layer, a bearer layer and a charging system.

The service application server is adapted to send to the charging system an application layer charging message including application layer charging information, a subsystem layer charging correlation identifier and/or a bearer layer charging correlation identifier.

The subsystem layer is adapted to send to the charging system a subsystem layer charging message including subsystem layer charging information, the subsystem layer charging correlation identifier and the bearer layer charging correlation identifier.

The bearer layer is adapted to send to the charging system a bearer layer charging message including bearer layer charging information, the subsystem layer charging correlation identifier and the bearer layer charging correlation identifier.

The charging system correlates these received charging messages in accordance with the received subsystem layer charging correlation identifier and/or bearer layer charging correlation identifier and performs charging in accordance with the charging information in the correlated charging messages.

The service application server further includes a receiving unit, a charging information generating unit and a transmitting unit; the charging information generating unit is adapted to generate peer-to-peer session charging information in accordance with a subsystem layer charging correlation identifier and/or a bearer layer charging correlation identifier generated by a peer-to-peer communication network system as well as peer-to-peer session information of peer-to-peer communication parties, which are received by the receiving unit, and the peer-to-peer session charging information is carried in a charging request message which is transmitted by the transmitting unit to the charging system.

Moreover, in another embodiment of the service application server according to the present invention, the service application server further includes:
a session control unit adapted to control the peer-to-peer communication service according to a charging result returned from the charging system, the charging result being obtained by the charging system by obtaining charging information of the subsystem layer and/or bearer layer corresponding to the peer-to-peer communication service in accordance with the peer-to-peer session information, the subsystem layer charging correlation identifier and the bearer layer charging correlation identifier and performing correlation.

Particularly, the communication system further includes:
a first instant messaging terminal and a second instant messaging terminal.

The first instant messaging terminal is adapted to send an invite message to the subsystem layer, reserve a resource with the bearer layer for media transmission and send an instant message to the bearer layer after establishing peer-to-peer communication.

The second instant messaging terminal is adapted to send an acknowledgement response message to the subsystem layer and receive the instant message forwarded from the bearer layer after establishing peer-to-peer communication.

Figure 4:
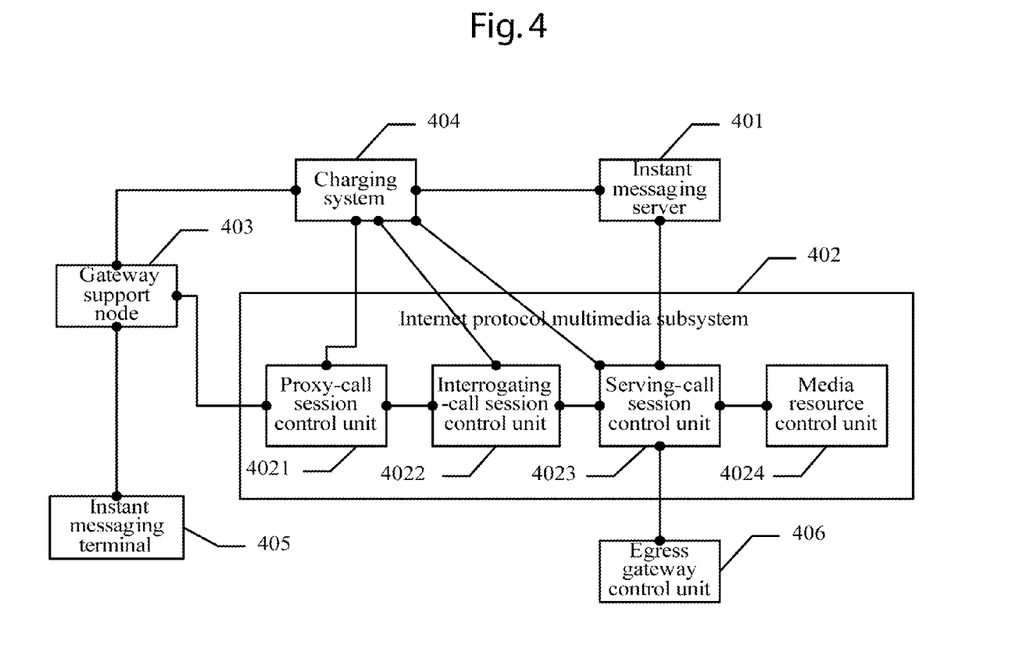
FIG. 4 is a schematic diagram of a structure of a system according to the present invention.

A specific embodiment of the communication system according to the invention is illustrated in FIG. 4. With reference to FIG. 4, this embodiment includes:
an instant messaging server 401, an Internet protocol multimedia subsystem 402, a gateway support node 403, a charging system 404, an instant messaging terminal 405 and an egress gateway control unit 406.

The Internet protocol multimedia subsystem 402 includes a proxy-call session control unit 4021, an interrogating-call session control unit 4022, a serving-call session control unit 4023 and a media resource control unit 4024.

With respect to the above communication system, the instant messaging server 401 accomplishes the function of the service application server, the Internet protocol multimedia subsystem 402 accomplishes the function of the subsystem layer, and the gateway support node 403 accomplishes the function of the bearer layer.

Figure 5:
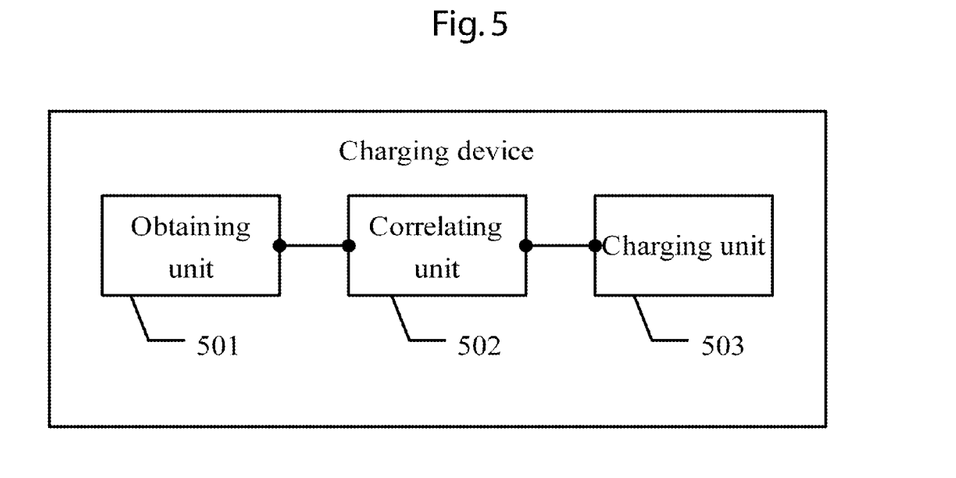
FIG. 5 is a schematic diagram of a charging device according to the present invention.

With reference to FIG. 5, a charging device according to the invention includes an obtaining unit 501, a correlating unit 502 and a charging unit 503.

The obtaining unit 501 is adapted to respectively obtain from a service application server an application layer charging message including application layer charging information, a subsystem layer charging correlation identifier and/or a bearer layer charging correlation identifier, obtain from a bearer layer a bearer layer charging message including bearer layer charging information, the subsystem layer charging correlation identifier and the bearer layer charging correlation identifier, and obtain from a subsystem layer a subsystem layer charging message including subsystem layer charging information, the subsystem layer charging correlation identifier and the bearer layer charging correlation identifier.

The correlating unit 502 is adapted to correlate the obtained charging messages in accordance with the obtained subsystem layer charging correlation identifier and/or bearer layer charging correlation identifier.

The charging unit 503 is adapted to perform charging in accordance with the charging information in the correlated charging messages.

The peer-to-peer communication charging method, communication system and charging device provided according to the invention have been described in detail above, the principle and implementing modes of the invention have been set forth in this document by way of specific embodiments, and the description of the above embodiments is merely intended to facilitate understanding the inventive method and the essence thereof. As appreciated by those ordinarily skilled in the art, modifications made to the embodiments and their applications are possible in light of the idea of the invention. Accordingly, the contents in the description shall not be taken as limiting the scope of the invention, which is defined by the claims. The invention as claimed is intended to encompass all foreseeable equivalents to each of the limitations of the claims.

What is claimed is:

1. A peer-to-peer communication charging method, comprising:
performing by a service application server, upon receipt of a session request message for establishing a peer-to-peer communication originated from a client:
generating, by the service application server, an application layer charging message, wherein the application layer charging message comprises peer-to-peer session information of the peer-to-peer communication, an IP Multimedia subsystem (IMS) layer charging correlation identifier (ICID) and a bearer layer charging correlation identifier (GCID);
sending, by the service application server, the application layer charging message to a charging system;
utilizing by the charging system, the application layer charging message to obtain charging information of the corresponding IMS layer and bearer layer, and to correlate the obtained charging information to further obtain information on bearer traffic transmitted in the peer-to-peer communication; wherein the correlating comprising:
correlating the IMS layer charging message with the application layer charging message in accordance with the IMS layer charging correlation identifier (ICID) in the application layer and the IMS layer charging correlation identifier (GCID) in the IMS layer charging message;
correlating the IMS layer charging message and the bearer layer charging message in accordance with the bearer layer charging correlation identifier (GCID) in the IMS layer charging message and the bearer layer charging correlation identifier (GCID) in the bearer layer charging message, and then correlating the bearer layer charging message with the application layer charging message;

obtaining same port numbers and peer-to-peer uniform resource locators in the bearer layer charging information of the correlated bearer layer charging message as port numbers and peer-to-peer uniform resource locators (URLs) in an application layer charging information of the correlated application layer charging message; and obtaining the information on bearer traffic transmitted during the session in accordance with the obtained peer-to-peer uniform resource locators and the port numbers.

2. The method according to claim 1, wherein the method comprising:

sending, by the service application server, upon receipt of the session request message, a session invite message to another client, and upon receiving a response message from the another client, generating the peer-to-peer session information.

3. The method according to claim 1, wherein the peer-to-peer session information between parties in the established peer-to-peer communication comprises one or more of the following:

Uniform Resource Locators (URLs), IP addresses, port numbers, and protocol type.

4. The method according to claim 1, comprising:

controlling, by the service application server, a peer-to-peer communication service based on a charging result returned from the charging system, wherein the charging result corresponds to the transmitted bearer traffic.

5. A peer-to-peer communication charging method, comprising: a charging system in a peer-to-peer communication, enabled to perform:

receiving an application layer charging message comprising application layer charging information, an IP Multimedia subsystem (IMS) layer charging correlation identifier (ICID) and a bearer layer charging correlation identifier (GCID);

receiving an IMS layer charging message, which comprises IMS layer charging information, the ICID and the GCID;

receiving a bearer layer charging message, which comprises bearer layer charging information, the ICID and the GCID; and correlating the received application layer charging message, the IMS layer charging message and the bearer layer charging message to obtain information on bearer traffic transmitted in the peer-to-peer communication, and to perform charging to the bearer traffic information, wherein the correlating comprising:

correlating the IMS layer charging message with the application layer charging message in accordance with the IMS layer charging correlation identifier (ICID) in the application layer and the IMS layer charging correlation identifier (ICID) in the IMS layer charging message;

correlating the IMS layer charging message and the bearer layer charging message in accordance with the bearer layer charging correlation identifier (GCID) in the IMS layer charging message and the bearer layer charging correlation identifier (GCID) in the bearer layer charging message, and then correlating the bearer layer charging message with the application layer charging message:

obtaining same port numbers and peer-to-peer uniform resource locators in the bearer layer charging information of the correlated bearer layer charging message as port numbers and peer-to-peer uniform resource locators (URLs) in an application layer charging information of the correlated application layer charging message: and obtaining the information on bearer traffic transmitted during the session in accordance with the obtained peer-to-peer uniform resource locators and the port numbers.

6. The peer-to-peer communication charging method according to claim 5, wherein the application layer charging information comprises peer-to-peer uniform resource locators and/or negotiated port numbers.

7. The peer-to-peer communication charging method according to claim 5, wherein the correlating comprising:

correlating the bearer layer charging message with the application layer charging message in accordance with the GCID in the application layer charging message and the GCID in the bearer layer charging message.

8. The peer-to-peer communication charging method according to claim 5, comprising:

obtaining, by the IMS layer, an invite message originated from an instant messaging terminal to the IMS layer;

allocating, by the IMS layer, the ICID in accordance with the invite message, and controlling service by reserving a media transmission resource between the instant messaging terminal and the bearer layer;

obtaining the GCID by exchanging the ICID and the GCID with the bearer layer;

sending, by the IMS layer to the service application server, the invite message in which the ICID and the GCID are carried.

9. The peer-to-peer communication charging method according to claim 5, comprising:

reserving a media transmission resource between an instant messaging terminal originating an invite message, and the bearer layer;

generating the GCID in accordance with the media transmission resource, and exchanging the ICID and the GCID with the IMS layer.

10. The peer-to-peer communication charging method according to claim 9, comprising:

generating the bearer layer charging message comprising bearer layer charging information, the ICID and the GCID, and sending the bearer layer charging message to the charging system.

11. The peer-to-peer communication charging method according to claim 10, wherein the bearer layer charging information comprises negotiated port numbers and/or peer-to-peer uniform resource locators, and the charging method further comprising:

obtaining the invite message by the bearer layer, wherein the invite message comprises uniform resource locators and port numbers indicative of an originator and a destination upon the instant messaging terminal establishing the communication session.

12. A communication system comprises a service application server, wherein the service application server is adapted to communicate with an IMS layer, a bearer layer and a charging system, wherein:

the service application server sends to the charging system, an application layer charging message, wherein the application layer charging message comprises application layer charging information, an IMS layer charging correlation identifier (ICID) and a bearer layer charging correlation identifier (GCID), wherein the application layer charging information comprises peer-to-peer uniform resource locators (URLs) and negotiated port numbers;

the IMS layer sends to the charging system, an IMS layer charging message, wherein the IMS layer charging message comprises IMS layer charging information, the ICID and the GCID;

the bearer layer sends to the charging system, a bearer layer charging message, wherein the bearer layer charging message comprises bearer layer charging information, the ICID and the GCID; and the charging system correlates the received charging messages in accordance with the received ICID and the GCID to obtain information on bearer traffic transmitted in the peer-to-peer communication, and performs charging in accordance with the bearer traffic information, wherein the correlating comprises the charging system further enabled to:

correlate the IMS layer charging message with the application layer charging message in accordance with the IMS layer charging correlation identifier (ICID) in the application layer and the IMS layer charging correlation identifier (ICID) in the IMS layer charging message;

correlate the IMS layer charging message and the bearer layer charging message in accordance with the bearer layer charging correlation identifier (GCID) in the IMS layer charging message and the bearer layer charging correlation identifier (GCID) in the bearer layer charging message, and then correlating the bearer layer charging message with the application layer charging message;

obtain same port numbers and peer-to-peer uniform resource locators in the bearer layer charging information of the correlated bearer layer charging message as port numbers and peer-to-peer uniform resource locators (URLs) in an application layer charging information of the correlated application layer charging message; and obtain the information on bearer traffic transmitted during the session in accordance with the obtained peer-to-peer uniform resource locators and the port numbers.

13. The communication system according to claim 12, comprises a first instant messaging terminal and a second instant messaging terminal, wherein:

the first instant messaging terminal sends an invite message to the IMS, reserves a resource for media transmission with the bearer layer, and sends an instant message to the bearer layer after establishing peer-to-peer communication; and the second instant messaging terminal sends an acknowledgement response message to the IMS layer, and receives the instant message forwarded from the bearer layer after establishing the peer-to-peer communication.

14. A charging device, comprising an obtaining unit, a correlating unit and a charging unit, wherein:

the obtaining unit:

obtains from a service application server, an application layer charging message which comprises application layer charging information, peer-to-peer uniform resource locators (URLs) and negotiated port numbers, an IMS layer charging correlation identifier (ICID) and a bearer layer charging correlation identifier (GCID);

obtains from a bearer layer, a bearer layer charging message which comprises bearer layer charging information, the ICID and the GCID; and obtains from an IMS layer, an IMS layer charging message which comprises IMS layer charging information, the ICID and the GCID;

the correlating unit correlates the obtained application layer charging message, the bearer layer charging message and the IMS layer charging message in order to obtain information on bearer traffic transmitted in the peer-to-peer communication; and the charging unit performs charging in accordance with the bearer traffic information;

wherein the correlating comprises the correlating unit further enabled to:

correlate the IMS layer charging message with the application layer charging message in accordance with the IMS layer charging correlation identifier (ICID) in the application layer and the IMS layer charging correlation identifier (ICID) in the IMS layer charging message;

correlate the IMS layer charging message and the bearer layer charging message in accordance with the bearer layer charging correlation identifier (GCID) in the IMS layer charging message and the bearer layer charging correlation identifier (GCID) in the bearer layer charging message, and then correlating the bearer layer charging message with the application layer charging message;

obtain same port numbers and peer-to-peer uniform resource locators in the bearer layer charging information of the correlated bearer layer charging message as port numbers and peer-to-peer uniform resource locators (URLs) in an application layer charging information of the correlated application layer charging message; and obtain the information on bearer traffic transmitted during the session in accordance with the obtained peer-to-peer uniform resource locators and the port numbers.

15. The communication system according to claim 12, wherein the service application server comprises a receiving unit, a charging information generating unit and a transmitting unit, wherein the charging information generating unit generates peer-to-peer session charging information in accordance with the ICID and the GCID, and wherein the peer-to-peer session charging information is transmitted by the transmitting unit via a charging request message to the charging system.

16. The communication system according to claim 15, wherein the service application server comprises:

a session control unit enabled to controlling a peer-to-peer communication service according to a charging result returned from the charging system, wherein the charging result is obtained by correlating the received application layer charging message, the bearer layer charging message and the IMS layer charging message by the charging system.

17. The communication system according to claim 12, wherein the IMS layer is configured to perform:

obtaining an invite message originated from an instance messaging terminal to the IMS layer;

allocating the ICID in accordance with the invite message, and reserving a media transmission resource between the instant messaging terminal and the bearer layer;

obtaining the GCID by exchanging the ICID and the GCID with the bearer layer;

sending to the service application server the invite message, wherein the invite message comprises the ICID and the GCID.

18. The communication system according to claim 12, wherein the bearer layer is configured to perform:
reserving a media transmission resource between an instant messaging terminal and the bearer layer, wherein the instant messaging terminal originates an invite message;
generating the GCID in accordance with the media transmission resource, and exchanging the ICID and the GCID with the IMS layer.

19. The method according to claim 5, wherein the service application server sends to the charging system, an application layer charging message which comprises Message Session Relay Protocol (MSRP) charging information, and wherein the charging system correlates the MSRP charging information with traffic charging information from a Traffic Plane Function (TPF) in order to filter out the traffic charging information of a MSRP peer-to-peer session from the TPF.

20. The method according to claim 1, wherein the peer-to-peer session information comprises Message Session Relay Protocol (MSRP) charging information, which records Uniform Resource Locators (URLs) and port numbers for a two-party MSRP session, wherein the charging comprising:
the IMS layer sending a subsystem layer charging message to the charging system, wherein the subsystem layer charging message comprises the ICID, the GCID and the MSRP charging Information; and
the bearer layer sending a bearer layer charging message to the charging system, wherein the bearer layer charging message comprises the ICID, the GCID and bearer layer charging information;
wherein the obtaining of information on the transmitted bearer traffic comprising:
correlating the charging information from the service application server with the charging information having the same ICID in the IMS charging data record (CDR);
inquiring the corresponding GCID in the IMS CDR in accordance with the ICID;
correlating the charging information in the IMS CDR with the bearer layer charging information having the same GCID in the bearer layer CDR;
obtaining the negotiated port numbers and peer-to-peer URLs in the application layer charging information in the service application server CDR;
inquiring the same negotiated port numbers and peer-to-peer URLs among the negotiated port numbers and peer-to-peer URLs in the bearer layer charging information as the negotiated port numbers and peer-to-peer URLs in the application layer charging information; and
inquiring the corresponding stream identifier dependent upon the port numbers and peer-to-peer URLs, and obtaining the information on bearer traffic transmitted by the MSRP in accordance with the stream identifier.

21. The peer-to-peer communication charging method according to claim 5, wherein the application layer charging information comprises peer-to-peer Uniform Resource Locators (URLs) and negotiated port numbers;
wherein the obtaining of information on transmitted bearer traffic comprising:
correlating the IMS layer charging message with the application layer charging message in accordance with the IMS layer charging correlation identifier in the application layer charging message and the IMS layer charging correlation identifier in the IMS layer charging message;
correlating the IMS layer charging message and the bearer layer charging message in accordance with the bearer layer charging correlation identifier in the IMS layer charging message and the bearer layer charging correlation identifier in the bearer layer charging message, and then correlating the bearer layer charging message with the application layer charging message;
obtaining the same port numbers and peer-to-peer uniform resource locators in the bearer layer charging information of the correlated bearer layer charging message as port numbers and peer-to-peer uniform resource locators in the application layer charging information of the correlated application layer charging message; and
inquiring the corresponding stream identifier dependent upon the obtained port numbers and peer-to-peer URLs and obtaining the information on bearer traffic transmitted during the session in accordance with the stream identifier.

22. The communication system according to claim 12, wherein the application layer charging information comprises peer-to-peer uniform resource locators and negotiated port numbers, wherein the charging system is adapted to obtain information on transmitted bearer traffic in the peer-to-peer communication, wherein the obtaining of information on transmitted bearer traffic comprising:
correlating the IMS layer charging message with the application layer charging message in accordance with the IMS layer charging correlation identifier in the application layer charging message and the IMS layer charging correlation identifier in the IMS layer charging message;
correlating the IMS layer charging message and the bearer layer charging message in accordance with the bearer layer charging correlation identifier in the IMS layer charging message and the bearer layer charging correlation identifier in the bearer layer charging message, and then correlating the bearer layer charging message with the application layer charging message;
obtaining the same port numbers and peer-to-peer uniform resource locators in the bearer layer charging information of the correlated bearer layer charging message as port numbers and peer-to-peer uniform resource locators in the application layer charging information of the correlated application layer charging message; and
inquiring the corresponding stream identifier dependent upon the obtained port numbers and peer-to-peer URLs and obtaining the information on bearer traffic transmitted during the session in accordance with the stream identifier.

23. The charging device according to claim 14, wherein the application layer charging message comprises peer-to-peer uniform resource locators (URLs) and negotiated port numbers;
wherein the correlating unit obtains information on transmitted bearer traffic in the peer-to-peer communication by performing:
inquiring the corresponding stream identifier dependent upon the obtained port numbers and peer-to-peer URLs and obtaining the information on bearer traffic transmitted during the session in accordance with the stream identifier.

* * * * *